Aug. 16, 1960

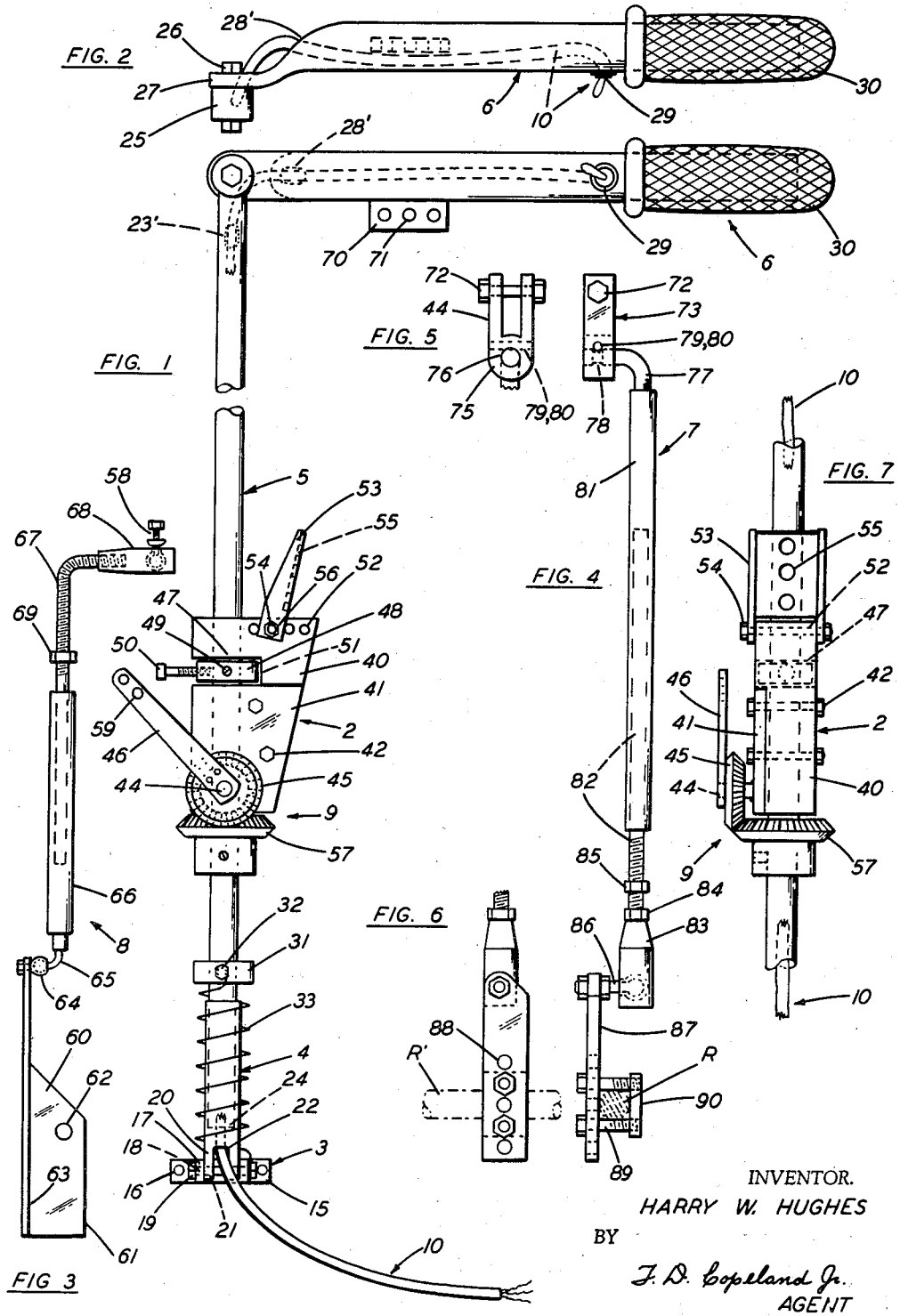

H. W. HUGHES 2,949,044

CAR HAND CONTROLS

Filed July 10, 1957

INVENTOR.
HARRY W. HUGHES

BY

F. D. Copeland Jr.
AGENT

United States Patent Office 2,949,044
Patented Aug. 16, 1960

2,949,044

CAR HAND CONTROLS

Harry W. Hughes, Rte. 1, Garland, Tex.

Filed July 10, 1957, Ser. No. 670,983

7 Claims. (Cl. 74—481)

This invention relates generally to automotive accessory equipment and more particularly to a device to permit all of the foot operated controls for driving an automobile to be operated by the operator's hands from his normal driving position.

Another object is to provide a set of hand driving equipment whereby the accelerator pedal, foot brake, and headlight dimming switch may all be operated by hand controls within easy reach of the driver.

And a still further object is to provide a unique hand driving apparatus wherein all of the formerly foot operated controls may be operated selectively and virtually simultaneously by only one of the driver's hands, leaving the other hand free for steering purposes.

And yet another object is to provide a set of hand driving equipment as described which will permit the operation of certain normally foot-operated controls by hand but which will not prevent the operation of these controls by foot action if such is desired.

An additional object is to provide a single left hand operated lever by which the accelerator pedal is controlled by a vertical movement of the lever and by which the brake pedal is controlled by a downward forward movement which latter movement may take place at any point during the vertical movement.

And another object of this invention is to provide a safe, efficient, and easy to operate set of hand driving equipment for a vehicle and yet such an equipment that will be extremely rugged and durable in operation and at the same time economical in construction.

And yet a further object is to provide an extremely simple structure for a set of hand driving equipment whereby the same equipment may be readily installed in different automobiles having varying distances from the dash to the floor board and having various other size and design differences.

The standard conventional automobiles as delivered from the factory include a steering wheel, a gear shift lever and other hand operated equipment, a brake, accelerator, and possibly other foot operated controls. Many persons who are perfectly capable of operating all of the hand controls are prevented from driving due to their inability to satisfactorily operate the foot controls due to varying degrees of physical incapacity. Certain auxiliary equipment has been used in the past to provide a hand control for the foot pedals of an automobile, but many of these devices have become obselete due to automobile style and model changes which prevent interchangeability or installation on late model cars. One such style change was the introduction of the enlarged and irregular shaped hood which surrounds the steering column and interferes with the use of hand control equipment which was supported from the steering column. It is therefore another object of this invention to provide an apparatus of hand driving equipment which may be installed on any late model car having a dash and a floor board which employs an automatic transmission.

These and other objects and advantages will be apparent from an examination of the following specification and drawing in which:

Figure 1 represents a front elevational view of the basic hand driving equipment assembly prior to installation on a vehicle.

Figure 2 is a top plan view of the device of Figure 1.

Figure 3 is an elevational view of the accelerator pedal attachment to be used with the basic assembly of Figure 1.

Figure 4 is an elevational view of the brake pedal attachment to be used with the assembly of Figure 1.

Figure 5 is a detail plan view of the universal clip for attaching the brake actuating linkage to the control lever.

Figure 6 is a detail plan view of the pedal mounting bracket detached from the device of Figure 4.

Figure 7 is a top plan view of the dash mounting member detached from the device of Figure 1.

Figure 8:
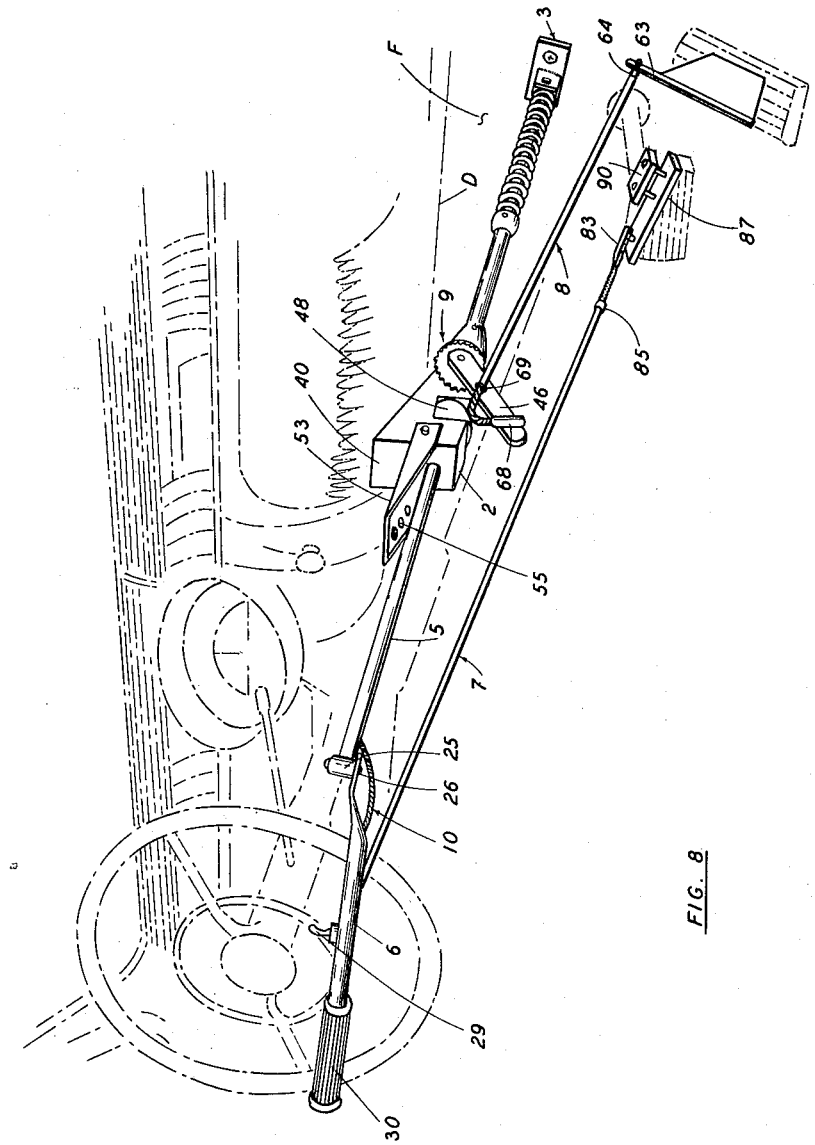
Figure 8 is a prespective view showing the installation of the hand-driving equipment of this invention in a conventional passenger automobile.

Referring now more particularly to the characters of reference on the drawing it will be observed that the complete assembly of the hand driving equipment of this invention consists basically of a dash mounting member 2, a floor board mounting bracket 3 with a telescope tube 4 mounted thereon, a centrally mounted rotary shaft 5 extending through the member 2 and terminating within the tube 4, a hand control lever 6 attached to the shaft 5, a brake linkage assembly 7 attached to and operated by the lever 6, an accelerator linkage assembly 8 operated through gears 9 from the rotary shaft 5, and an electrical circuit assembly 10 passing through the main shaft 5 and lever 6 for the purpose of providing a hand control for dimming the auto headlights.

Bracket 3 includes a flat base 15 having mounting holes 16 by means of which the base 15 may be attached to an automobile floor board indicated at F in Figure 8. Bracket 3 also includes a pair of spaced upstanding ears 17 having aligned holes 18 by which the bolt 19 may be employed to attach the lower projecting yoke 20 of the tube 4 to the bracket in pivotal relation thereto. Eye holes 21 of yoke 20 surround the shank of bolt 19 in a well-known manner to provide the desired pivotal movement. An open cut-out 22 in the side wall of tube 4 adjacent the yoke 20 provides access to the hollow interior of the tube 4 and permits lead assembly 10 to pass out to its connection with the auto electrical system (not shown). Shaft 5 includes an opening 23 virtually throughout its complete length and this opening passes through the circumference at hole 23' to permit the lead assembly 10 to enter shaft 5 near its upper end and then pass completely therethrough and out the lower open end 24 and then through cut-out 22 as described.

The upper end of shaft 5 is welded or otherwise permanently attached to a hollow collar 25 through which a pivot bolt 26 passes prior to its attachment to the flattened eye piece 27 of lever 6. A hole 28' similar to hole 33 of shaft 5 is provided in lever 6 to permit passage of lead assembly 10 into and through hole 28 to connection with a two-position switch 29 near the end of lever 6 containing the non-slip handle grip 30. By this construction, the operator's thumb can easly manipulate the switch 29 while his hand is holding the grip 30. It will be observed that the position of the lower end 24 of shaft 5 is determined by the position of collar 48, and a second set screw collar 31 is secured to the rod by its set screw 32; this latter set screw provides an upper anchor point for spring 33, while pivot bolt 19 provides the lower anchor point for spring 33.

The dash mounting member 2 includes a block 40 made of a fiber base material so that when the shaft 5 passes therethrough in a snug but free turning relationship, the block 40 acts as a bearing for the shaft 5 at this point. At the lower end 24, shaft 5 is provided with a second bearing point by means of the tube 4 and by this employment of two spaced bearing points, the upper end of shaft 5 may be allowed a considerable overhang without effecting its operation or efficiency. On one side of block 40, a metal plate 41 is attached by bolts 42, and this plate includes a perpendicular gear shaft 44 which is welded thereto at 43 and about which gear 45 and its rigidly attached lever arm 46 are adapted to rotate. Block 40 includes a cut-out or recess 47 in which a collar 48 is inserted so that shaft 5 may pass through the collar 48 and block 40 simultaneously. A set screw 49 attaches collar 48 to shaft 5, and a second set screw 50 is also attached to collar 48 and it is of a substantial length so that when shaft 5 is being rotated by return spring 33 in a direction to return lever 6 to its neutral position (to be more fully described hereafter), the stop screw 50 will strike the bottom edge 51 of the recess 47 and shaft 5 will be held against any further turning movement. The presence of collar 48 on shaft 5 will also prevent any longitudinal movement of the shaft during operation. Near its upper edge, block 40 includes a series of spaced through bolt holes 52 to permit selective mounting of dash bracket 53 by means of bolt 54. Bracket 53 itself includes a series of holes 55 so that a degree of adjustment is permitted when it is attached to the underside of the dash D. The bracket 53 has a U-shaped cross-section to provide rigidity and also to provide a pair of parallel ears 56 through which bolt 54 passes when inserted in its selected hole 52 of block 40. By loosening bolt 54, the bracket 53 may be pivoted until the best mounting angle is attained.

When the complete assembly of the hand driving equipment is installed as shown in Figure 8, the lever 6 is in such a position that the normal vertical movement of the driver's left hand (which will be in a vertical plane tipped slightly forward) will impart a rotary movement to shaft 5, which being journalled in block 40 and tube 4, is free to rotate upon a counterclockwise movement. This rotary movement is employed to turn gear 57 which is rigidly fastened to shaft 5 and gear 57 being in mesh with gear 44 will turn the latter and its attached lever arm 46 which is connected at installation to accelerator linkage 8 by means of bolt 58 which engages one of the holes 59 in lever arm 46. The gears 44 and 57 may have any desired ratio, and one successful embodiment employes a ratio of 2:1. When manual pressure is removed from hand lever 6, the automobile accelerator is returned to its neutral position by the action of its own return spring and the hand lever 6 is returned simultaneously to its neutral position by the unwinding of spring 33 which will rotate shaft 5 until the stop screw 50 strikes the bottom edge 51 of recess 47. By this action there is no drag or interference against the return to neutral of either the foot pedal or the hand lever, and collar 48 is so positioned on the shaft that there will be no slake in the controls linkage.

The accelerator pedal identified at P in Figure 8 is attached at its bottom side to the flat section 60 of pedal mounting plate 61 by passing a screw through hole 62 and into pedal P when the shoulder 63 of plate 61 is snugly engaging the left side of the pedal P. Shoulder 63 extends up a substantial distance above the top of both section 60 and pedal P so that its attached socket joint 64 does not interfere with the driver's use of pedal P by foot control if this is desired.

A ball joint member 65 extends from the lower end of tube 66 to provide one end of a universally swivelled connection with lever arm 46. A hook-shaped rod 67 is threaded at its upper end to engage a ball and socket joint member 68 and also a captive nut 69 and is plain at its lower end to provide a vertically sliding fit with tube 66. It will be observed in Figures 3 and 8 that the position of nut 69 will determine when rod 67 will impart downward movement to mounting plate 61 and consequently to pedal P for increasing the speed on the car, and it will also be apparent that pedal P may be depressed by foot in the ordinary manner and this action is not interfered with by the presence of the linkage 8 since tube 66 simply slides down along rod 67 to whatever distance desired.

Hand control lever 6 includes a forward and downwardly facing lug 70 including selective mounting holes 71 which are adapted to receive bolt 72 of a unique universal bracket 73 by which the hand lever 6 is attached to the brake control linkage 7. Bracket 73 has two projecting ears 74 through which bolt 72 passes after the ears are installed in surrounding but free-sliding relation on lug 70; the ears 74 will thus maintain a straight forward direction even through lever 6 moves in an arc due to its pivotal connection at bolt 26. The ears 74 terminate in a circular body 75 having an axial bore 76 through which the curved end of brake linkage shank 77 extends. Shank 77 includes a circumferential recess 78 at a point on the shank which is in the bore 76 when the shank engages the bore. A locking pin 79 is inserted through an opening 80 in body 75 which is transverse to the bore 76 and just nicks the circumference of the bore so that when pin 79 is inserted through opening 80 it will also pass through groove 78 and thus lock shank 77 against axial movement in the bore 76 without interfering with the rotary movement between the shank and bore. A relatively long sleeve 81 is attached to the lower portion of shank 77 and extends down to a sliding connection with the upper end of brake link rod 82. The lower threaded end of rod 82 engages a threaded ball and socket joint 83 and is secured thereto by a lock nut 84. A stop nut 85 is adjustable over a substantial distance on rod 82 for the purpose of determining the point at which sleeve 81 will impart downward movement to the rod and consequently to the brake pedal B to permit the installation of this brake linkage 7 in different automobiles and this construction will also permit conventional foot operation of the pedal B without interference when the hand controls are not in use. Joint 83 engages a ball bolt 86 which is attached to one end of brake rod clamp 87, and the other end of clamp 87 includes a series of holes 88 by which bolts 89 may securely bind a clamp plate 90 against a brake pedal rod R as indicated in phantom in Figure 4. The combination of clamp 87 and plate 90 may be employed as in Figure 8 to securely engage the rod R of a floor board supported brake pedal B, or this combination may be employed as indicated in Figure 6 to attach to and operate a brake pedal B' which is suspended from the upper part of the firewall as in certain late model automobiles. An important structural feature in brake linkage 7 is the fact that rod 82 is free to rotate within tube 81 so that in operation of the controls, the brake linkage is free to function regardless of the position of lever 6. This will of course permit the brake to be operated independent of and simultaneously with operation of the accelerator by means of the linkage of this invention, and conversely, the accelerator controls may be operated simultaneously with or independent of the brake controls.

From the foregoing description it will be readily seen that there has been produced a device which substantially fulfills the objects of this invention as set forth herein. The invention is not limited to the exemplary constructions herein shown and described, but may be made in many ways within the scope of the appended claims.

What is claimed is:

1. An apparatus of hand driving equipment for a vehicle having a floor board, a dash, a steering column, an accelerator pedal, and a brake pedal, comprising: A hand control lever, a shaft substantially parallel to said steering column, a bearing block adjustably attached to said dash, a bearing hole completely through said block to support said shaft for a rotary motion therein, the lower end of said shaft being extended through said block and being mechanically biased to return said shaft to a normal angular rotational position, the upper end of said shaft being pivotally connected to said lever in such a manner to permit independent downward forward movement of said lever and to cause said shaft to rotate when said lever is moved in a counterclockwise direction, and linkage means between said lever and said brake pedal to permit an operating force to be applied to said brake pedal by said forward movement, and linkage means between said shaft and said accelerator pedal to permit an operating force to be applied to said accelerator pedal by said counterclockwise movement.

2. An apparatus of hand driving equipment as in the preceding claim characterized by the inclusion of gear means between said shaft and said last named linkage means.

3. An apparatus of hand driving equipment for a vehicle having a steering post, a dash, a floor board and at least one foot pedal, comprising: a bearing block attached to the underside of the dash, a bracket rigidly attached to the floor board in alignment with the said block, a bearing hole in said block extending substantially parallel to said steering post, a rotary shaft extending thru said gearing hole to the vicinity of said bracket, means to adjustably and rotatably support the lower end of said shaft from said bracket, the upper end of said shaft extending in cantilever fashion from said block to the vicinity of a driver's location in the vehicle, a hand lever operatively attached to the upper end of said shaft, and means operated by said shaft to impart movement to said foot pedal in response to movement of said hand lever.

4. An apparatus as in the preceding claim wherein said means comprises a bevel gear rigidly attached to said shaft, a mating gear pivotally supported from said block, a lever arm rotated by said mating gear and linkage means connected from the free end of said arm to said pedal in operating relation thereto.

5. An apparatus of hand driving equipment for a vehicle having a dash, a steering wheel, a floor board, and at least one foot pedal comprising: a bearing block attached to the underside of the dash, a bracket rigidly attached to the floor board in alignment with said block, a bearing bore in said block extending through the bearing block toward said bracket, a rotary shaft extending thru said bearing bore to the vicinity of said bracket, means to rotatably and pivotally support said shaft from said bracket, said bearing block including mounting means adjustable in two directions to permit said rotary shaft to be first pivoted at its lower end from said bracket and then adjusted at its other end by adjustably moving said bearing block to thereby position the upper end of the rotary shaft relative to said steering wheel.

6. A mounting means for installing an apparatus of hand driving equipment having a rotary shaft in an automobile having a dash and a floor board comprising: a non-metallic mounting block for attaching to the dash, a long bearing hole extending through said block and adapted to receive said shaft in free turning relation, a recess in said block extending transversely to and including the area of said block in alignment with said hole, a locking collar in said recess and rigidly attached to and surrounding said shaft, a bracket mounted on said floor board, a tube pivoted at one end to said bracket, said tube receiving the lower end of said shaft in free turning relation; said mounting means comprising, a rewind spring having one end rigidly supported from said shaft and the other end supported in fixed relation from said floor board whereby said shaft will impart energy to said spring when said shaft is rotated in one direction and will receive energy from said spring when said shaft is rotated the other direction.

7. An apparatus of hand driving equipment for a vehicle having a dash, a steering column, an accelerator pedal and a brake pedal, comprising: a hand control lever, a shaft substantially parallel to said steering column, bearing block means to support said shaft from the underside of said dash in a manner to permit rotary motion of said shaft, the upper end of said shaft being pivotally connected to said lever in such a manner as to permit both a counterclockwise movement of said lever and substantially forward movement of said lever, and linkage means to apply an operating force to said pedals in response to said lever movements, said hand lever characterized by an offset at its point of attachment to said shaft in a direction to permit said shaft to be above the area of driver occupancy in said vehicle.

References Cited in the file of this patent

UNITED STATES PATENTS

| | | |
|---|---|---|
| 1,444,563 | Short | Feb. 6, 1923 |
| 2,489,727 | Shipley | Nov. 29, 1949 |
| 2,602,348 | Wilson | July 8, 1952 |
| 2,658,409 | Hughes | Nov. 10, 1953 |
| 2,777,335 | Engberg et al. | Jan. 15, 1957 |
| 2,783,659 | Kelsey et al. | Mar. 5, 1957 |